(No Model.)

G. W. FIELDING & H. E. BRYANT.
METALLIC WHEEL.

No. 249,166.  Patented Nov. 8, 1881.

Witnesses.

Inventor.
George W. Fielding
Henry E. Bryant

UNITED STATES PATENT OFFICE.

GEORGE W. FIELDING, OF SOMERVILLE, AND HENRY E. BRYANT, OF WOBURN, ASSIGNORS OF TWO-THIRDS TO EDWIN E. BEAN, OF BOSTON, MASSACHUSETTS.

METALLIC WHEEL.

SPECIFICATION forming part of Letters Patent No. 249,166, dated November 8, 1881.

Application filed September 9, 1881. (No model.)

*To all whom it may concern:*

Be it known that we, GEORGE W. FIELDING, of Somerville, in the county of Middlesex and State of Massachusetts, and HENRY E. BRYANT, of Woburn, in the said county and State, citizens of the United States, have jointly invented a new and useful Metallic Wheel, of which the following is a specification.

Our invention relates to improvements in wheels embodying, so far as we are aware, an entirely new principle, and to the method of construction to utilize this principle.

The main novelty of our invention consists in the peculiar spokes below described for suspending the weight from the rim of the wheel.

Other novelties of our invention are the means employed for attaching the spokes to the rim and hub, so that all the spokes may be brought to an even tension sufficient to withstand the blows and shocks to which the rim and hub may be subjected.

The object of our invention is to embody these improvements in a light, simple, strong, and cheap wheel, that can be put together and have its parts properly adjusted with great facility. This object is attained by constructing the wheel substantially as hereinafter described, and as illustrated in the accompanying drawings, in which—

Figure 1:
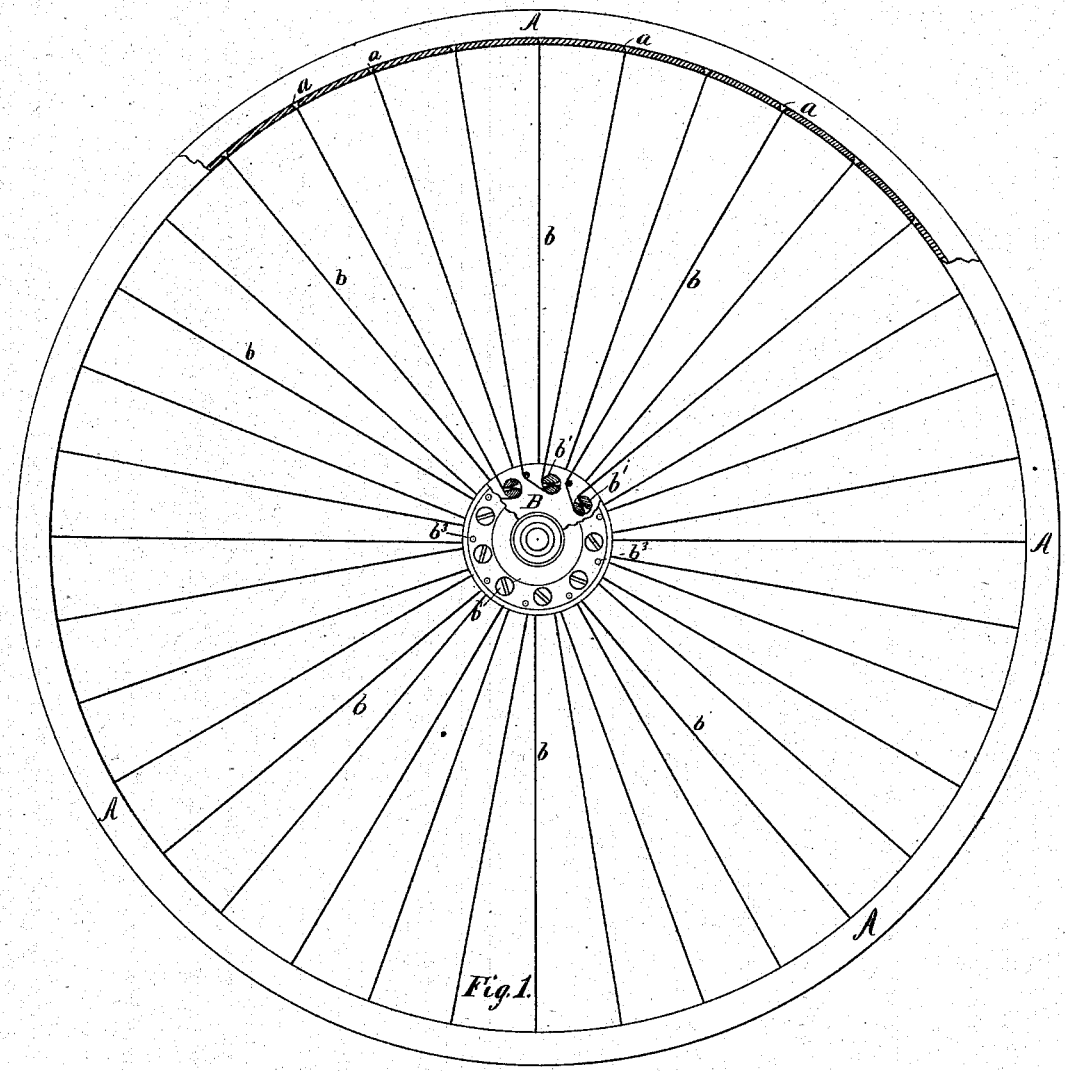
Figure 2:
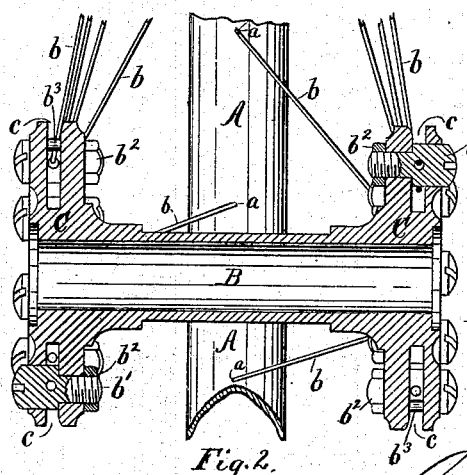

Figure 1 is a side view of a wheel with parts of the rim and hub broken away. Fig. 2 is a longitudinal section through the hub, showing a portion of the rim and some of the spokes.

The metal rim A has holes $a$ equidistant from each other, and of the proper number to receive the spokes $b$, which consist of steel wire of the requisite fineness and flexibility to allow it to be wound on a pin. The holes $a$ are rounded on the outer edges, to save the wire from undue wear.

The hub B is sufficiently long to give the spokes $b$ an extended base or bearing to provide against lateral strains, and has at or near each end a plate or flange, C, with a groove or channel, $c$, in it for the reception of the ends of the spokes $b$, which are attached to pins $b'$, similar to the wrest-pins of a piano, by which they are all strained alike to the required tension. The pins $b'$, passing through the flange C and channel $c$, are turned by nicked or square heads on one end, and are retained in place by the set-nuts $b^2$ on the other end; or the set-nuts and heads may be on the same end.

The pins or rollers $b^3$, passing through the channel $c$ and secured on both sides thereof in the flange C, are used when two spokes are made from one piece of wire, taking the places of one-half of the pins $b'$ and alternating in position with the remaining half.

The piece of wire to make two spokes is passed through two of the holes $a$ in the rim A, corresponding to two adjacent spokes on the same side, and one end of it is brought direct to the proper pin, $b'$; the other end is passed under the pin $b^3$ next on the left to the aforesaid pin $b'$, and then to said pin $b'$, on which both ends are wound to an even tension. The wire is passed under the pin $b^3$ to the left of the pin $b'$, and the pin $b'$ is turned to the left to tighten the wires, because the set-nuts $b^2$ are right-handed, and therefore the reacting strain of the wires prevents them from working loose.

It is evident that one piece of wire could be used for two adjacent spokes on opposite sides of the wheel by fastening one of its ends to a pin on one end of the hub and passing the other end through two adjacent holes in the rim to a pin on the other end of the hub.

The lower half of the rim forms a semicircular arch, which is well stayed by the strained spokes and admirably adapted to receive and support the weight suspended from the upper half, and if properly shaped will require less weight of material for equal strength than the rims of wheels as ordinarily constructed.

It is obvious that wire cords, metallic bands, and the like may be used for spokes, and that wheels of any size and for any purpose may be constructed on this principle by using material of the requisite strength; but in the foregoing description and in the accompanying drawings we have had reference more particularly to a bicycle-wheel actually constructed and used by us, in which the spokes were made of fine steel wire and the rim of the usual V-shaped metal.

We claim as our joint invention and desire to secure by Letters Patent—

1. In a wheel with flexible spokes adapted for tensile strains only, the method of adjusting and regulating the tension of the spokes by the pins $b'$; substantially as described.

2. In a wheel, the combination, substantially as hereinbefore set forth, of the rim, the flexible spokes, and the hub, with pins on which to wind the spokes to an even tension, for the purposes specified.

GEORGE W. FIELDING.
HENRY E. BRYANT.

Witnesses:
W. A. COPELAND,
JOHN R. SNOW.